United States Patent
Ormson

(10) Patent No.: US 7,215,971 B2
(45) Date of Patent: May 8, 2007

(54) METHOD AND APPARATUS FOR COMPENSATION OF DOPPLER INDUCED ERROR IN A MOBILE HANDSET

(75) Inventor: Richard Ormson, Berkshire (GB)

(73) Assignee: NEC Corporation, Tokyo (JP)

( * ) Notice: Subject to any disclaimer, the term of this patent is extended or adjusted under 35 U.S.C. 154(b) by 296 days.

(21) Appl. No.: 10/122,204

(22) Filed: Apr. 16, 2002

(65) Prior Publication Data

US 2002/0155862 A1    Oct. 24, 2002

(30) Foreign Application Priority Data

Apr. 20, 2001 (GB) .................... 0109794.8

(51) Int. Cl.
*H04B 15/00* (2006.01)
*H04B 17/00* (2006.01)
*H04M 1/00* (2006.01)

(52) U.S. Cl. .............. 455/502; 455/67.11; 455/67.16; 455/552.1; 455/553.1

(58) Field of Classification Search ............ 455/67.11, 455/67.16, 265, 456.1, 502, 506, 552.1, 553.1, 455/456.6
See application file for complete search history.

(56) References Cited

U.S. PATENT DOCUMENTS

| | | | | |
|---|---|---|---|---|
| 5,539,730 A * | 7/1996 | Dent | .......................... | 370/280 |
| 6,128,327 A * | 10/2000 | Bird et al. | .................. | 375/132 |
| 6,167,268 A * | 12/2000 | Souissi et al. | .............. | 455/434 |
| 6,201,973 B1 * | 3/2001 | Kowaguchi | .............. | 455/456.6 |
| 6,330,446 B1 * | 12/2001 | Mori | ...................... | 455/435.2 |
| 6,424,637 B1 * | 7/2002 | Pecen et al. | ................ | 370/328 |
| 6,665,540 B2 * | 12/2003 | Rantalainen et al. | .... | 455/456.5 |

* cited by examiner

*Primary Examiner*—Jean Gelin
*Assistant Examiner*—Un C. Cho
(74) *Attorney, Agent, or Firm*—Sughrue Mion, PLLC

(57) ABSTRACT

A method and apparatus for correcting for Doppler shift in GSM signals at a mobile handset in communication with a base station is provided. The rate of change of position of the mobile unit is detected in relation to the base station and a Doppler correction is derived from the rate of change. This can be used when calculating the synchronization of the UMTS timebase from the GSM network information.

8 Claims, 5 Drawing Sheets

METHOD AND APPARATUS FOR COMPENSATION OF DOPPLER INDUCED ERROR IN A MOBILE HANDSET

BACKGROUND OF THE INVENTION

1. Field of the Invention

The present invention relates to a method and apparatus for correcting for Doppler induced error in a GSM (global system for mobile communication) handset of the dual band type that is able to communicate on both GSM and UMTS (Universal Mobile Transmission Standard) networks.

2. Description of the Prior Art

Most mobile phones in Europe now operate on the GSM transmission standard. However, the next generation of the mobile telephones and other portable communication devices will adopt the UMTS system. In the transitional period, it will be necessary for phones to be able to work on both systems and this is a situation which may prevail for some time.

In order for the phone to operate properly in both GSM and UMTS modes, the clocks for the two modes must be translatable. Thus, the handset must not lose synchronization with the GSM network when it is used on the UMTS network and vice versa.

When the phone is not in a call, this is not a problem as there is plenty of time available for the phone to perform all required synchronization measurements with both networks.

When the phone is in a call on the UMTS network, there are commands available to the phone to cause transmission gaps between the phone and a base station with which it is in communication, so again there is no particular problem in synchronizing to the UMTS clock. Here, the transmission gap is a difference of time or frequency due to disturbance such as propagation delay and fading.

However, when the phone is in a call on the GSM network, the only times available for making synchronization on clock measurements with the UMTS network are "idle" periods which are 1 GSM frame in length and approximately 120 milliseconds apart from each other. Certain of the measurements required to synchronize with UMTS take longer than 120 milliseconds to perform and so have to be split over more than one idle frame. To successfully complete such a measurement, the mobile unit has to keep track of the UMTS frame timing (which it must establish during the first GSM idle frame) until the next GSM idle frame. The accuracy required for this depends on the window size of the UMTS decoder. Since window size relates directly to the processing power required and hence to the cost and power consumption of the decoder, the window size needs to be kept as small as possible to minimize cost and power consumption. Thus, the interests of cost and power consumption work against the requirement for accurately maintaining synchronization with the UMTS clock. In such instances, the only clock available to time the UMTS operation is the GSM clock. This can apparently vary with respect to the UMTS system and the size of variation, and hence the window size required to achieve synchronization depends on two factors:

1. the difference between UMTS and GSM network clocks at the respective base stations; and
2. the Doppler shift in the GSM signals caused by the motion of the handset relative to the GSM base station. When a handset is "camped on" to a network, it automatically locks its local clock to the observed signals from the network. These signals are Doppler shifted if the handset is moving. As a UMTS base station is not necessarily at the same location as the GSM base station, the Doppler shift may cause errors in UMTS timebase calculation.

SUMMARY OF THE INVENTION

An object of the present invention is to provide a method and apparatus which enables to properly calculate a timebase of UMTS by correcting a Doppler shift in a GSM signal.

According to a first aspect of the present invention, there is provided a method for correcting for Doppler shift in signals at a mobile handset in communication with a base station comprising the steps of: detecting the rate of change of position of the mobile unit in relation to the base station; deriving a Doppler correction from the rate of change; and applying the Doppler correction to a timebase.

In method according to the first aspect, the mobile unit may be a dual band unit, the method may further comprises the step of: using the Doppler correction to calculate the synchronization with the timebase of a second system when the handset is operating in a network of a first system.

In the method according to the first aspect, the step of detecting the rate of change of position may comprise detecting changes in a distance signal at the handset.

According to a second aspect of the present invention, there is provided an apparatus for correcting for Doppler shift in signals at a mobile handset in communication with a base station comprising: means for detecting the rate of change of position of the mobile unit in relation to the base station; means for deriving a Doppler correction from the rate of change; and means for applying the Doppler correction to a timebase.

In the apparatus according to the second aspect, the mobile unit may be a dual band unit, the apparatus may further comprise: means for using the Doppler correction to calculate the synchronization with the timebase of a second system when the handset is operating in a network of a first system.

In the apparatus according to the second aspect, the means for detecting the rate of change of position may comprise means for detecting changes in a distance signal at the handset.

These and other objects, features and advantages of the present invention will become more apparent in the light of the following detailed description of the best mode embodiments thereof, as illustrated in the accompanying drawings.

DETAILED DESCRIPTION OF THE PREFERRED EMBODIMENT

Preferred modes of embodiment according to the present invention will be described with reference to the accompanying drawings.

Clearly nothing can be done about the first factor within the mobile unit. However, we have appreciated that it is possible to make a compensation for Doppler shift in the GSM signals caused by motion of the handset. In a preferred embodiment, the sample window size required is reduced from ±2 samples in the UMTS decoder to ±1 sample. This reduces the processing power required by 40%.

The invention is defined in the appended claims to which reference should now be made.

Figure 1:
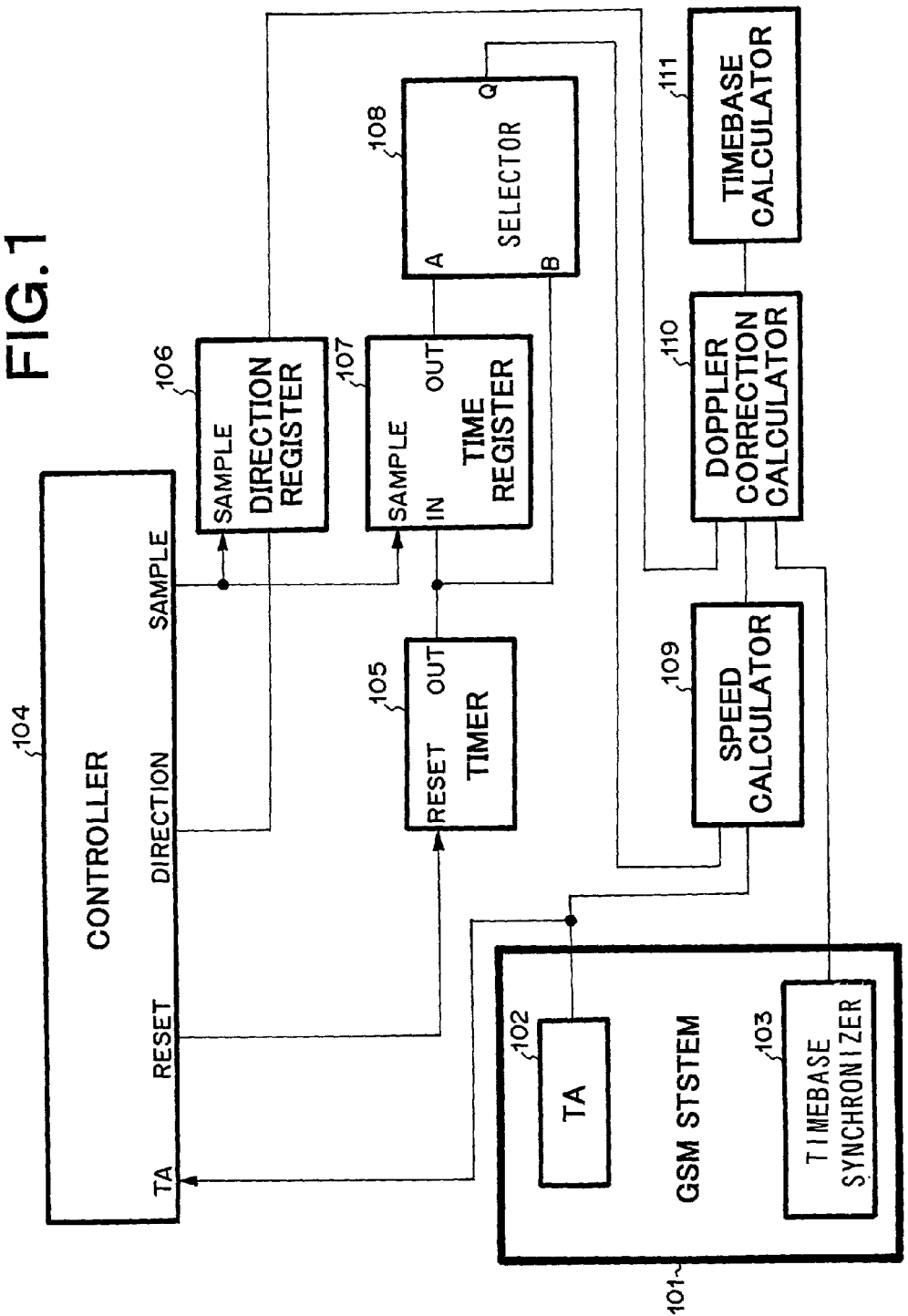
FIG. 1 is a block diagram showing an apparatus for compensation of Doppler Induced Error in a Mobile Handset according to an embodiment of the present invention.
Figure 2:
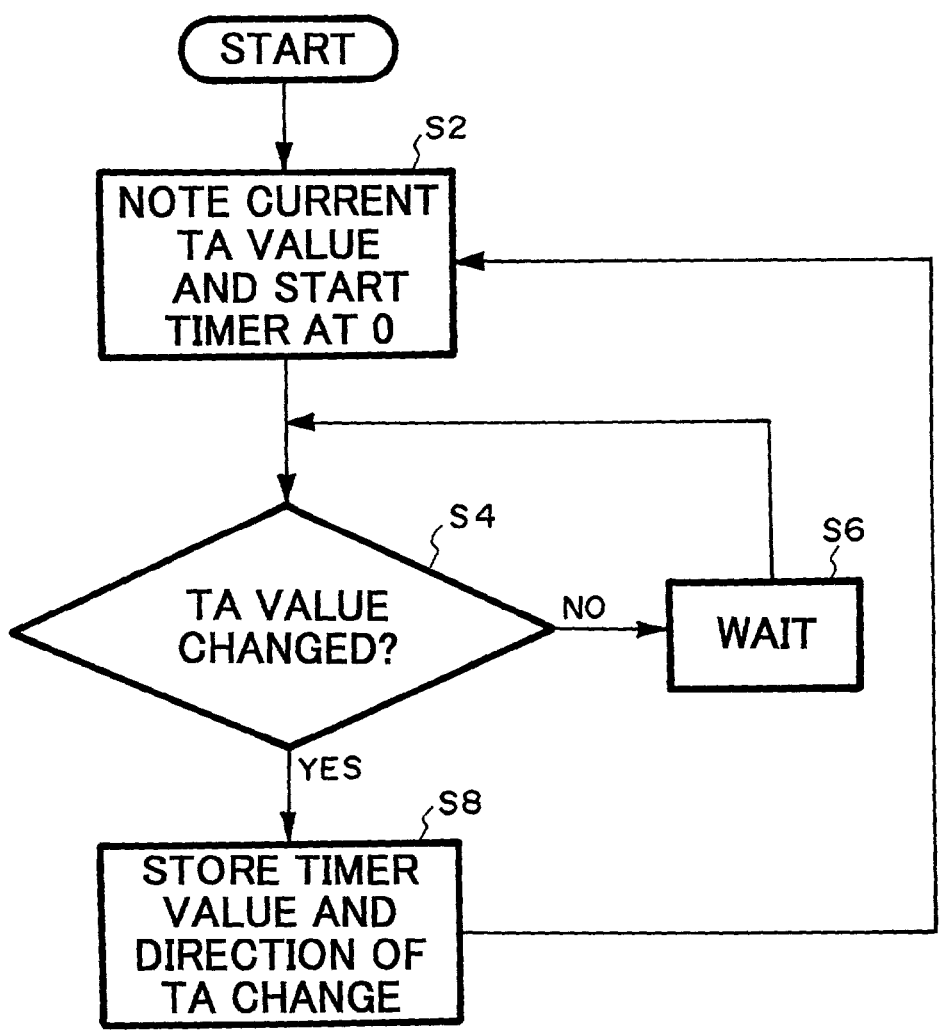
FIG. 2 is a flow diagram showing how the mobile unit gathers the information required to compensate for Doppler error by the apparatus as shown in FIG. 1.
Figure 3:
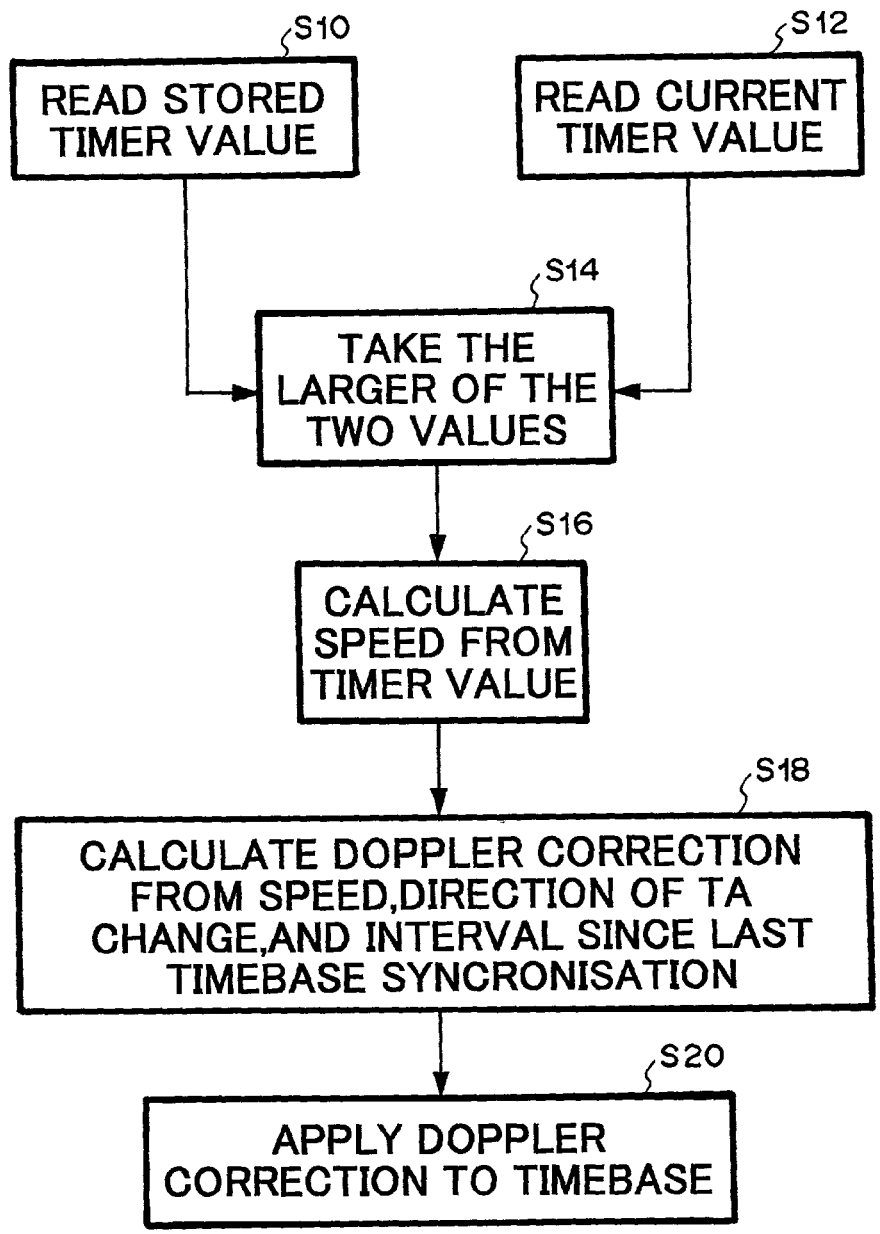
FIG. 3 is a flow diagram showing how Doppler error is corrected by the apparatus as shown in FIG. 1.

A preferred embodiment of the invention will now be described in detail by way of example with reference to the accompanying drawings in which:

FIG. 1 is a block diagram showing the structure of an apparatus for compensating of Doppler Induced Error in a GSM Mobile Handset;

FIG. 2 is a flow diagram showing how the mobile unit gathers the information required to compensate for Doppler error; and FIG. 3 is a flow diagram showing how Doppler error is corrected.

Doppler shift is introduced into a radio signal when the source and receiver are moving towards or away from each other. A frequency shift is introduced as a result of this motion and this is related to the speed of motion. However, only the component of the motion along the axis between the receiver and transmitter is important. That is to say, it is the rate of change of distance between the receiver and transmitter which is responsible for the Doppler shift.

The GSM system is a time division multiple access radio system. In order to ensure that signals from all handsets which communicate with a particular base station in a cellular network arrive in their correct time alignment, the base station sends what are known as "timing advance" (TA) signals to each handset. TA is a rough measure of the distance between the handset and the base station. It has a resolution of approximately 550 meters. Thus, the current timing advance value at a mobile unit is related to the distance of that unit from the base station.

In FIG. 2, the process performed by the handset to detect changes in timing advance data is shown. At step S2, the current TA value based on the location of the handset is noted and a timer 105 is started at zero by controller 104. The current TA value is accessed from TA block 102 in GSM system 101 from controller 104. At step S4, after a predetermined interval of time, controller 104 examines the TA value to see if it has changed. If it has not, the controller 104 enters a loop which includes a wait period at step S6 before examining the TA value again to see if it has changed. If the TA value has changed, then controller 104 stores the value accumulated in the timer to time register 107 and the direction of TA change to direction register 106 at step S8. The direction is either up or down depending on whether the handset is moving away or towards the base station.

The controller 104 then returns to step S2 which commences the process again by looking at the current TA value and starting the timer 105 at zero.

Figure 4:
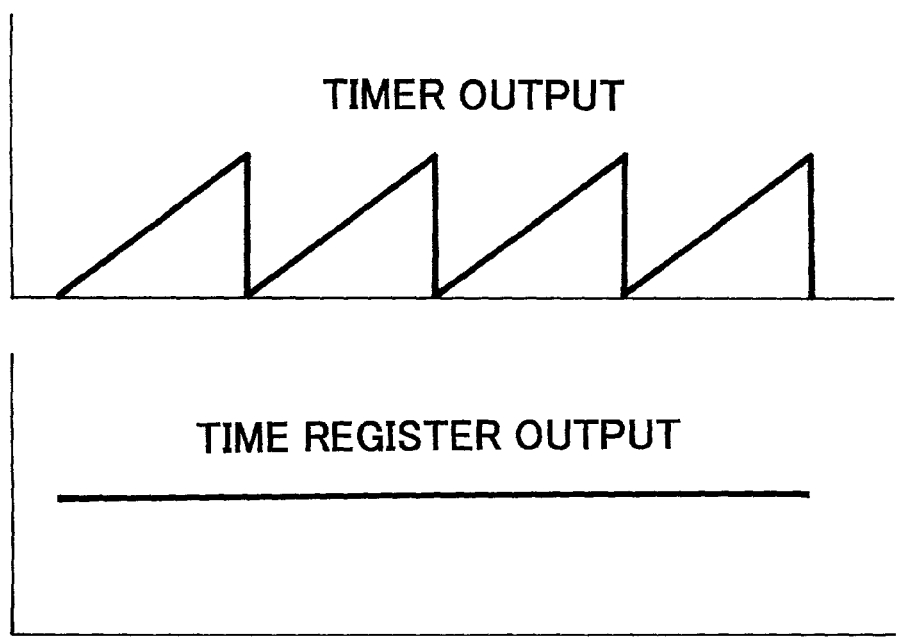
FIG. 4 is a graph showing an output of a timer and an output of a time register when a handset is moving at a constant velocity in relation to a base station.
Figure 5:
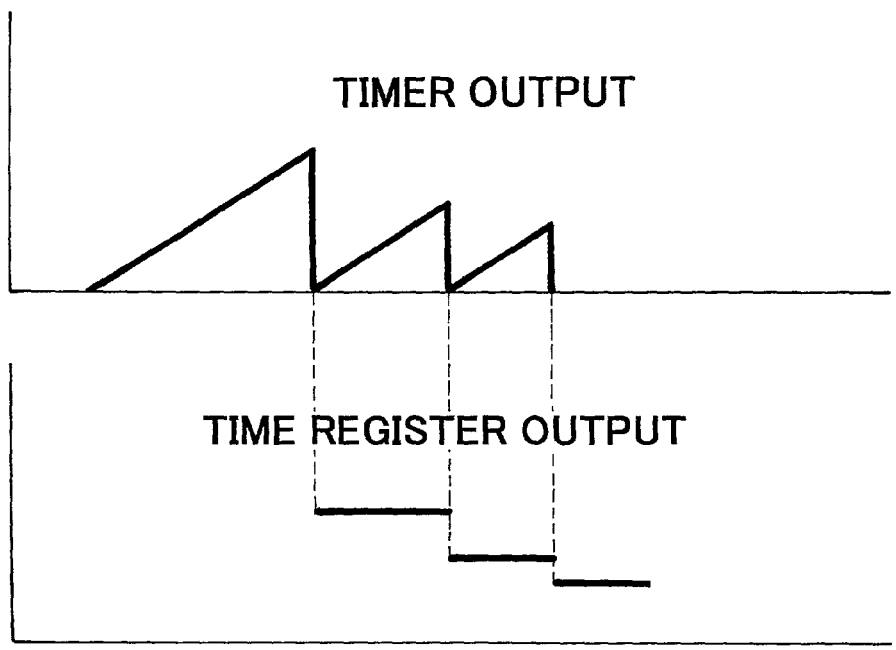
FIG. 5 is a graph showing the output of the timer and the output of the time register when the handset is accelerating away in relation to the base station.
Figure 6:
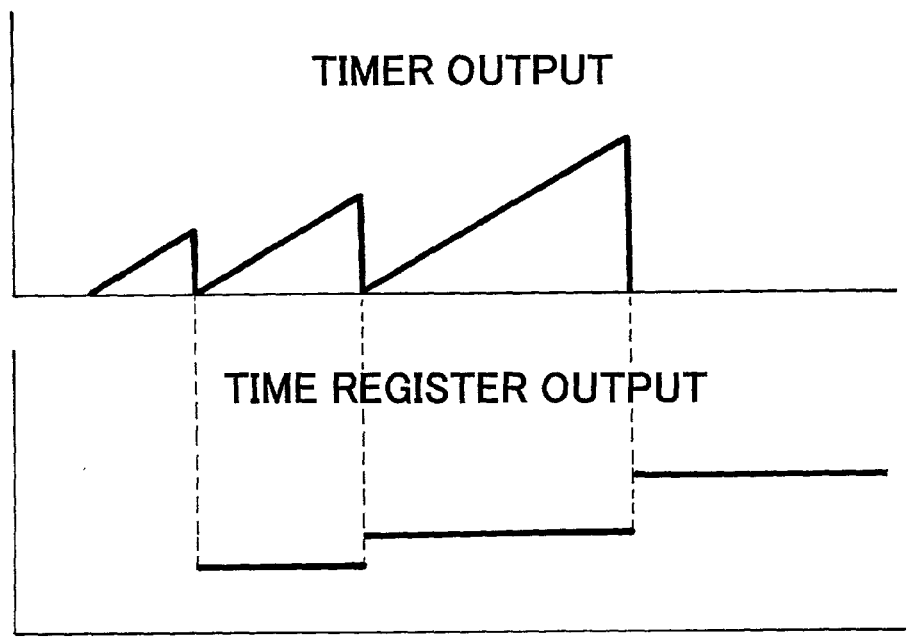
FIG. 6 is a graph showing the output of the timer and the output of the time register when the handset is decelerating in relation to the base station.
Figure 7:
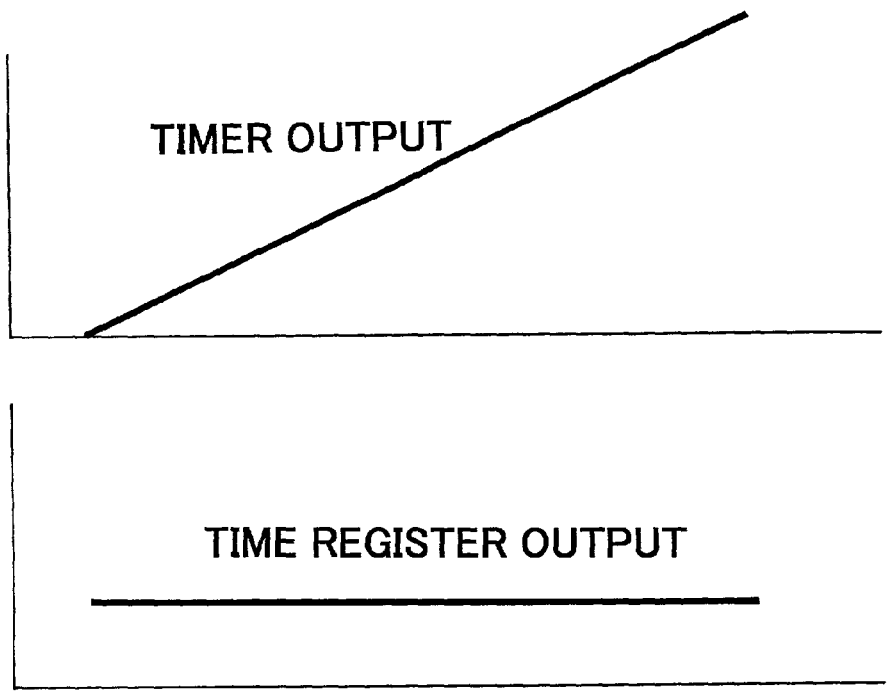
FIG. 7 is a graph showing the output of the timer and the output of the time register when the handset is not moving in relation to the base station.

FIG. 3 shows how the information obtained in the process as shown in FIG. 2 and other information are used. Firstly, selector 108 reads the timer value stored in time register 106 in step S10 and the current timer value from timer 105 at step S12. Selector 108 compares these values at step 14 and selects the larger of these. As shown in FIG. 4, if the mobile unit is moving at a constant velocity relative to the base station, then the larger of the two values will usually be the stored value, although this need not necessarily be the case. As shown in FIG. 5, if it is accelerating away, then it will also usually be the stored value, but again it need not necessarily be so. As shown in FIG. 6, if it is decelerating, then it is likely that the current value will be the larger. As shown in FIG. 7, if there is no movement, then it is likely that the current value will be the larger.

At step 16, speed calculator 109 calculates the speed of the mobile unit relative to the base station using the selected timer value and the change in the TA value in accordance with the formula as follows:

$$\text{speed} = (TA2 - TA1)/\text{selected\_value}.$$

Thereafter, doppler correction calculator 110 calculates a Doppler correction at step S18 using the speed, the direction of the TA change (increasing or decreasing) and the interval since the last timebase synchronization was performed by timebase synchronizer 103.

This Doppler correction is then applied to the timebase calculation for UMTS by time base calculator 111 at step 20.

When a correction for the UMTS system is being calculated from GSM synchronization, the GSM synchronization is first established with the GSM base station. A timer, which runs from the local reference clock, for counting GSM frame and the like is then started; this timer tells us the current multi-frame number, frame number, slot number and ¼ bit number. It also informs the handset of them when something has to be done on GSM. A local reference clock tracks according to the received GSM frequency. When there is no activity on GSM, then the handset derives the synchronization to the UMTS base station. This is done by first starting a frame timer which gives the UMTS current multi-frame number, frame number, slot number and chip number. This counter also runs from the local reference clock. However, that clock is locked to the GSM network and will therefore result in an error in the chip counter field when it come to perform UMTS operations for a moving handset. Therefore, a wider window than would otherwise be needed is required.

Both the UMTS and GSM frame counters are automatically corrected whenever an air interface operation occurs on the relevant network. Doppler compensation will be a correction to the last field of the UMTS frame counter. The value of the correction is a product of the Doppler shift, the time since the last UMTS operation, and resolution of the counter itself.

Thus, it can be seen that GSM Doppler effect can be corrected for by measuring the rate of change of TA value and translating this into a correction factor to be applied when calculating the UMTS timebase in order to synchronize with that. It is therefore possible to reduce the GSM Doppler effect on the UMTS timebase using information that is already present within the system.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. A method for correcting for Doppler shift in signals at a mobile unit in communication with a base station comprising:
   detecting a rate of change of position of the mobile unit in relation to the base station;
   deriving a Doppler correction from a rate of change, wherein said deriving comprises determining a larger of a stored timer value and a current timer value,
   wherein, if said larger of a stored timer value and a current timer value is the stored timer value, it is an indicia of acceleration and if said larger of a stored timer value and a current timer value is the current timer value, it is an indicia of deceleration; and
   applying the Doppler correction to a timebase.

2. The method according to claim 1, wherein the mobile unit is a dual band unit, further comprising:
   using the Doppler correction to calculate the synchronization with the timebase of a second system when the mobile unit is operating in a network of a first system.

3. The method according to claim 1, wherein said deriving a Doppler correction
   is dependent upon: the speed of the mobile unit,
   a direction of movement of the mobile unit with respect to closer to or farther from the base station,
   selecting a larger timer value from a stored timer value and a current timer value,
   and an interval since a last timebase synchronization.

4. The method according to claim 1, wherein said change of position is detected by a change in timing advance value.

5. An apparatus for correcting for Doppler shift in signals at a mobile unit in communication with a base station comprising:
   detecting a rate of change of position of the mobile unit in relation-to the base station,
   means for deriving a Doppler correction from a rate of change, said means for deriving a Doppler correction comprising means for determining the larger of a stored timer value and a currently read timer value, determining a larger of a stored timer value and a current timer value,
   wherein, if said larger of a stored timer value and a current timer value is the stored timer value, it is an indicia of acceleration and if said larger of a stored timer value and a current timer value is the current timer value, it is an indicia of deceleration; and
   means for applying the Doppler correction to a timebase.

6. The apparatus according to claim 5, wherein the mobile unit is a dual band unit, further comprising:
   means for using the Doppler correction to calculate the synchronization with the timebase of a second system when the mobile unit is operating in a network of a first system.

7. An apparatus for correcting for Doppler shift in signals at a mobile unit in communication with a base station comprising:
   a controller for detecting a rate of change of position of the mobile unit in relation to the base station;
   a calculator for deriving a Doppler correction based in part on a rate of change, said calculator capable of determining a larger of a stored timer value and a currently read timer value,
   wherein, if said larger of a stored timer value and a current timer value is the stored timer value, it is an indicia of acceleration and if said larger of a stored timer value and a current timer value is the current timer value, it is an indicia of deceleration; and
   an applicator for applying the Doppler correction to a timebase.

8. The apparatus according to claim 7, wherein the mobile unit is a dual band unit, and said apparatus further comprises means for using the Doppler correction to synchronize the mobile unit with the timebase of a second system when the mobile unit is operating in a network of a first system.

* * * * *